US006072894A

United States Patent [19]

Payne

[11] Patent Number: 6,072,894

[45] Date of Patent: Jun. 6, 2000

[54] BIOMETRIC FACE RECOGNITION FOR APPLICANT SCREENING

[76] Inventor: John H. Payne, 3401 75$^{th}$ Ave. North, Minneapolis, Minn. 55443

[21] Appl. No.: 08/953,394

[22] Filed: Oct. 17, 1997

[51] Int. Cl.$^{7}$ ....... G06K 9/00

[52] U.S. Cl. ....... 382/118; 382/116; 382/203; 382/309; 382/135 T; 235/375; 235/379; 340/235; 340/825.3; 340/825.33; 340/825.34; 380/10; 380/24; 380/25; 902/27

[58] Field of Search ....... 382/118, 116, 382/203, 309, 135 T; 340/235, 825.34, 225.3, 225.33; 380/10, 24, 25; 235/375, 379; 902/27

[56] References Cited

U.S. PATENT DOCUMENTS

| | | | |
|---|---|---|---|
| 4,052,739 | 10/1977 | Wada et al. | 358/299 |
| 4,910,672 | 3/1990 | Off et al. | 705/14 |
| 4,995,081 | 2/1991 | Leighton et al. | 380/23 |
| 5,224,173 | 6/1993 | Kuhns et al. | 382/116 |
| 5,329,381 | 7/1994 | Payne | 358/455 |
| 5,331,544 | 7/1994 | Lu et al. | 705/10 |
| 5,442,162 | 8/1995 | Armel | 235/381 |
| 5,469,506 | 11/1995 | Berson et al. | 380/24 |
| 5,561,718 | 10/1996 | Trew et al. | 382/203 |
| 5,563,956 | 10/1996 | Nishikawa et al. | 382/118 |
| 5,592,377 | 1/1997 | Lipkin | 705/42 |
| 5,748,755 | 5/1998 | Johnson et al. | 382/115 |
| 5,761,329 | 6/1998 | Chen et al. | 382/118 |
| 5,864,363 | 1/1999 | Giefing et al. | 348/143 |

OTHER PUBLICATIONS

PA–1 Face Recog. Home Page, 1997.
PA–2 Viisage Technology, 1997.
PA–3 Visionics Face® DB, 1997.
PA–4 Mr. Payroll/Miros, 1997.

*Primary Examiner*—Matthew Bella
*Assistant Examiner*—Sheela Chawan

[57] ABSTRACT

Biometric facial comparison is deployed in a novel way to improve screening of applicants across multiple branch locations, preventing common forms of application fraud. The biometric facial comparison software is located at a computing location (20), readily accessible from a first applicant screening branch (30) and a subsequent applicant screening branch (40), by means of a communication network (10). The biometric facial screening is fast, affordable, nonintrusive, and takes place in person in the branch. Even if false identification documents are used, perpetrators will be automatically detected as they attempt to go from branch to branch making bogus transactions. Patterns of fraudulent behavior are detected even if no prior transaction is yet known to be fraudulent, and even if the applicant's face does not match the face of any known perpetrator. Although the first fraudulent transaction will generally not be immediately detected, detection will occur before any subsequent transaction are processed or approved.

17 Claims, 5 Drawing Sheets

BIOMETRIC FACE RECOGNITION FOR APPLICANT SCREENING

CROSS-REFERENCES TO RELATED APPLICATIONS

This invention optionally makes use of bilevel photographic images produced by the methods of my U.S. Pat. No. 5,329,381, "Automatic Engraving Method and Apparatus" issued Jul. 12, 1994.

BACKGROUND OF THE INVENTION

1. Field of Invention

This invention utilizes recent advances in biometric face recognition, a communication network such as the Internet, and information systems technology to prevent various forms of fraudulent applications from being approved.

2. Discussion of Prior Art

Check fraud is widespread in the U.S. A discussion of check fraud will detail approaches found in the prior art and clarify the role and need for the present invention.

*Business Week* has estimated U.S. check fraud losses to be in excess of $10 billion annually. Retailers, and ultimately their customers, absorb most of this cost. It is also a significant cost to U.S. depository institutions. In 1995, the Federal Reserve Board reported overall check fraud losses to U.S. depository institutions of $615 million annually.

Due to advances in color copier and scanner technology and widespread availability of desktop publishing systems, checks and identification documents (such as drivers' licenses) are more easily compromised than ever before. So, check fraud losses continue to mount.

It is time-consuming and expensive to catch and prosecute check fraud perpetrators. Conviction rates are low, and full restitution is an exceedingly rare event. Therefore prevention offers the best opportunity to significantly reduce check fraud.

The prior art includes a plurality of methods and commercial systems designed to prevent various types of check fraud.

Signature verification is one of the oldest means of check fraud prevention. However it is costly and time-consuming to fully implement; particularly considering that U.S. check volume is now 64 billion checks per year. Often the type of signature comparison being performed is more art than science. And in many instances of fraud the signature being used for comparison is unavailable, copied effectively, or compromised.

Video surveillance is also widely used to deter check fraud. However the bolder perpetrators are not deterred by video. By the time the fraud is detected, the video tape may well have been erased. Even if a video record is available, it will still be time-consuming and expensive to apprehend and prosecute the perpetrator.

Recently, banks in at least 17 states have required fingerprinting of noncustomers (i.e. individuals who do not have an account at the bank) before they will cash their checks. This approach has been highly successful in reducing noncustomer check fraud; however it has also proved to be somewhat controversial. In general, very few retailers would consider fingerprinting their customers because of the connotation of criminality. For similar reasons, very few banks will consider extending fingerprinting to their customers (i.e. individuals who do have accounts with them).

And that leaves a large hole in the current system. It is still far too easy to open a new checking account using false identification. Deluxe Corporation's Chexsystems T.M. is a widely-used commercial system used to screen the opening of new checking accounts. However, if the perpetrator has forged genuine identification documents, this type of screening will seldom be effective.

It can be seen, more generally, that applicant screening across multiple locations is far too lax. In the above discussion, an applicant moves freely from one financial institution branch to another opening new checking accounts, all based on false identification. In similar fashion a money launderer easily moves from one financial branch to another and, using bogus identification, rapidly deposits wads of cash. In still a further variation of the scheme, the applicant could be applying for loans at multiple branch locations, using false identification.

The above discussion suggests the need for biometric screening of applicants across multiple locations. A more complete examination of the prior art can help determine this. Will other emerging approaches solve the problem?

Returning now to the prior art specifically related to the prevention of check fraud, to authorize checks presented at point-of-sale, large computer networks and databases have been deployed. Three prominent examples of this type of commercial system are: Deluxe Corporation/Electronic Transaction Corporation's (ETC) SCAN system, Equifax's Welcome Check T.M., and First Data/Telecheck T.M.

Most current check authorization methods rely on machine-readable alphanumeric characters. In particular, the use of MICR (Magnetic Ink Character Recognition) technology is very widespread in the United States. By convention, the MICR characters are printed in the lower left corner on the front surface of bank checks.

Unfortunately, MICR is a mature technology which has been compromised using readily available tools and techniques. Magnetic toner cartridges can be inserted in most laser printers and print counterfeit MICR characters indistinguishable from the original.

More recently. Primary Payment Systems, Inc. (PPS) of Phoenix, Ariz. and Payment Solutions Network, Inc. (PSN) of Dallas, Tex., have been formed specifically to reduce check fraud. The PSN emphasis is on detecting and reporting bad checks more rapidly, without waiting for the paper checks to fully traverse the normal check clearing process. PPS is working to update check authorization databases on a daily basis with information such as accounts closed for cause.

In addition, a plurality of security approaches have been devised to discourage alteration or copying of the physical check. For example, SafeChecks T.M. offer artificial watermarks, copy void pantographs, chemical voids, microprinting, laid lines, and a plurality of additional security features to protect the physical check.

The PositivePay T.M. approach of Bottomline Technologies, Inc. is another noteworthy recent approach. It is designed to protect corporate checks from alteration of payee or amount. For example, payroll checks are protected in this way by providing an electronic list of payees and amounts of checks issued to nearby financial institutions. This electronic list is then compared to checks actually presented for payment.

Despite the above approaches, check fraud losses are still running in excess of $10 billion annually, and accelerating. A crucial limitation of the above methods is that they rely on identification documents (drivers' licenses, etc.) which are easily falsified.

Accordingly, the present invention is designed to prevent forms of fraud, including check fraud, in which false identification of the applicant plays a significant role. For example, New Account check fraud and Identity Assumption check fraud are two prevalent types of check fraud which rely on false identification.

In New Account fraud the perpetrator opens new checking accounts using false identification. A variety of techniques are then used to artificially inflate the balance of the accounts, withdraw funds from the accounts, and quickly flee.

In Identity Assumption fraud the perpetrator assumes the identity of a legitimate account holder, withdraws funds, and quickly flees.

Biometric solutions seem ideally suited to prevent this type of fraud. Biometrics refers to automatic computer-based systems and methods for positively identifying an individual. For example, electronic fingerprinting, iris scanning, and automatic face recognition are all examples of biometric approaches with this potential.

However, electronic fingerprinting and iris scanning carry the same connotation of criminality that has limited prior art applications of manual fingerprinting. Capturing the facial image of an applicant does not carry this connotation. Consumers are already accustomed to presenting a drivers' license (or like document) when conducting a financial transaction; and the drivers' licenses in all 50 states already contain an identification photo.

Since face recognition will generally be perceived as less intrusive than other forms of biometrics, and since the face image, once captured, can be used in many additional fraud prevention methods, it is the preferred biometric technique of the present invention.

All biometrics approaches, including face recognition, require some sort of initial enrollment of the true accountholder biometric information. Building this type of biometric database raises concerns about privacy. Even absent these concerns, it poses a real barrier to implementation. Certainly, it may take many years before a large database of biometric information can be constructed; and this work may be quite expensive. Financial viability requires an answer to the question: "How can a biometric approach provide an immediate deterrent to fraud—even before the database of biometric information is populated"?

Another important limitation of prior art approaches to check fraud prevention is the speed with which account holder and account status information can be shared among financial institutions and across branches. Programs are underway to update negative files (i.e. accounts closed for cause, etc.) on a daily basis; and that's a step in the right direction. In the above described scenarios this type of sharing needed to happen in minutes, not once every 24 hours, to prevent subsequent accounts from being opened.

Further, the perpetrators of New Account fraud will exploit organizational boundaries wherever it proves to be beneficial. From the perpetrators perspective it doesn't matter if the financial institution is an S&L, a bank, or a credit union. Any lack of cooperation or sharing of information between these institutions will be duly noted and exploited.

A practical solution must also be affordable and avoid offending good customers. For example, it is clearly not affordable to convert the 64 billion paper checks written in the U.S. each year to fully protected stock. And proposals to apply electronic fingerprinting biometrics have been so controversial they have been curtailed or withdrawn.

The prior art on check fraud prevention contains a related approach designed to combat check fraud: the Liberty Photocheck, U.S. patent application Ser. No. 08/573,273, titled "SYSTEM AND METHOD FOR CHECK AUTHORIZATION" by Richard F. Pliml, Robert E. Stiles, and John H. Payne. The Liberty Photocheck uses an account holder photo, encoded into a 2D barcode and preprinted on the check, to deter check fraud.

However, the Liberty Photocheck is focused on point-of-sale check fraud, not New Account check fraud, and in addition, will certainly face the practical problem: "How do you get the account holder photo in the first place"?

And therefore an approach is needed that will provide a source of account holder photos for the Liberty Photocheck or similar approaches, meet the above described requirements, and provide an immediate deterrent to the above described forms of check fraud, in particular New Account check fraud.

One of the building blocks of the required solution can be seen in recent progress with communication networks, such as the Internet. For example, by situating the biometric facial comparison capability on an Internet website, the required biometric capability can be readily accessible across organizational boundaries, affordable, and work in minutes (rather than hours or days).

In the early stages of implementation, the database of facial images (facebase) on the Internet website will be empty, or nearly so. How can New Account check fraud be prevented before the facebase is fully populated?

Fortunately, an extensive facebase is not required to start detecting behaviors known to have a high correlation with New Account check fraud. For instance, it is highly unusual for the same person to open multiple checking accounts at different financial institution branches within a short period of time. It is even more suspect if the person is using a different identity for each new account. To those skilled in the art this constitutes a "hard hit", an event with an extremely high correlation with New Account check fraud.

For example, in the present invention, though a perpetrator uses false identification to open a new checking account at a bank, his true biometric information (i.e. facial image) will be captured and uploaded immediately to the Internet website and stored in the facebase. If he then walks across the street and attempts to open a subsequent new checking account at a credit union, this behavior will be detected by the biometric facial comparison before the subsequent account is opened.

A useful byproduct of using facial biometrics to screen the opening of new checking accounts is that, over time, the facebase will become extensive, and can then support a plurality of additional fraud prevention techniques.

To conclude the discussion of the prior art specific to check fraud prevention, it is noteworthy that there are three additional immediate benefits to the financial institutions of using facial biometrics to screen the opening of new checking accounts. First, it is reasonable to expect that some would-be perpetrators will simply leave without opening an account because of a desire not to be photographed, especially since the photo is permanently logged and easily searched out by computer (unlike video tape). Second, the captured photos can be used by each financial institution internally to further secure other account holder transactions (i.e. deposits, withdrawals, transfers, and the like). And finally, when check fraud does occur, there is still the issue of who pays for it. Generally the financial institution will not be held liable; particularly if they can show they have exceeded the norm in protecting their account holders from fraudulent transactions.

More generally, in some forms of account fraud, such as loan applications, it may be the case that days or even weeks will elapse before a final determination is made to issue the loan. And it may be that additional screening, even absent the present invention, will determine the application is fraudulent before the loan is actually issued. If such cases, where the currently existing systems would have prevented the fraud anyway, the utility of the present invention is that it would have saved the time and expense of processing the fraudulent application, which may be considerable, and that it would have detected the fraud earlier.

Turning now to the prior art related to biometric face recognition systems and applications; how is the present invention distinguisable from them?

The field of biometric face recognition is growing and changing rapidly. The "Face Recognition Home Page" on the Internet, is perhaps the best single source of current information about Research Groups, Commercial Products, Freeware, Tutorials, related Internet Resources, Face recognition publications, and Upcoming events. Most prior art in this field is focused on making biometric face recognition work better, not on commercial applications. This prior art is easily distinguisable from the present invention. However, there are a few commercial face recognition products beginning to develop applications related to the present invention, and they deserve further attention.

Viisage Technology, Inc., of Littleton, Mass., has announced plans to use biometric face recognition to detect fraudulent drivers' licenses for the State of Illinois Department of Motor Vehicles. However, the screening proposed for Illinois drivers' licenses by Viisage Technology, Inc. is applied to a database of digital facial images after the license applications have been completed. It is not applied in an applicant screening branch while the applicant is present, and is not intended to detect fraud before any subsequent application can be processed.

Visionics, Inc. has announced a database version for its FaceIt T.M. face recognition software, called FaceIt T.M. DB. "Applicant Processing Systems" is listed among the intended applications. Further, the "internet version" of this product "features a client/server design with the server maintaining the database at some centralized location". These are among the reasons FaceIt T.M. DB is utilized in the preferred embodiment of the present invention. However, the present invention is distinct from FaceIt T.M. DB in that it uses facial similarity just as an initial stage to narrow the search; then it automatically examines historical transaction databases of prior requests to apply, or prior requests for privileges to detect behavior indicative of fraud. This requires substantial additional processing and multiple databases beyond what has so far been described in FaceIt T.M. DB. And it is also noteworthy that the present invention utilizes "requests to apply", or "requests for privileges", not data taken from completed applications. This is a significant difference since to see the full pattern of applicant behavior it is important to see all "requests to apply", not just those that resulted in a completed application—and it is important to detect this pattern at the earliest moment, not waiting until a prior application has been fully processed and accepted.

Mr. Payroll, Inc. of Ft. Worth, Tex., has announced plans to use the TrueFace T.M. face recognition system for its ATM-like check-cashing machines. This system is intended to secure check-cashing payment transactions, by verifying that the facial image matches the facial image of a previously enrolled customer. This is different from the present invention, which is screening the initial request to enroll for check cashing privileges, not the ongoing payment transactions.

To draw the distinction between the prior art on face recognition and this present invention more clearly, the present invention is focused specifically on applicant screening. It uses biometric facial comparison to narrow the search for fraudulent applications.

For example, the transaction history of prior applicants will typically include the type of transaction (e.g. request to open new checking account), the timestamp (i.e. the date and time application was made), and location (geographic location at which the application was made in person). And, therefore, the present invention has means to determine "have other applicants, with a strong facial resemblance to this applicant, recently engaged in the same type of application at nearby locations"? It is understood by those skilled in the art, that the present invention is not limited to the specifics of this example.

Still further distinctions are critical to fully understanding the uniqueness of the present invention. The present invention is not based on comparing the current applicant to known perpetrators, or to prior applications known to be fraudulent. At the time the facial comparison is made, it is not necessarily known that a prior application was fraudulent. In addition, the present invention is not designed to search through completed applications looking for duplicates, but to detect and prevent a subsequent fraudulent application before it is fully processed or accepted, and to do this across multiple locations.

The present invention is therefore novel in its application of biometric face recognition technology, and unique in its capabilities, in that it detects suspicious patterns of applicant behavior in minutes, before a subsequent application has been approved.

OBJECTS AND ADVANTAGES OF THE INVENTION

Accordingly, several objects and advantages of the present invention are:

(a.) To improve applicant screening by performing biometric facial recognition screening of applicants;

(b.) To provide a biometric applicant screening solution that is affordable;

(c.) To provide a biometric applicant screening solution that works in minutes;

(d.) To provide a biometric applicant screening solution that is highly reliable;

(e.) To provide a biometric applicant screening solution that is easy to use;

(f.) To provide a biometric applicant screening solution that requires very little training;

(g.) To prevent check fraud through biometric screening of applicants for new checking accounts;

(h.) To provide a biometric applicant screening solution with fast economic payback by working even before the database of facial images is fully populated;

(i.) To provide a biometric applicant screening solution that is easily accessible across organizational boundaries;

(j.) To provide a biometric applicant screening solution that will not be perceived by consumers as intrusive or offensive;

(k.) To detect applicant fraud during any subsequent application, before the subsequent application is processed;

(l.) To detect patterns of behavior likely to indicate applicant fraud, even though none of the prior transactions are yet known to be fraudulent, and even though the applicant's face does not match the face of any known perpetrator.

(m.) To capture biometric facial images and store them in the facebase, thus enabling and contributing to additional future fraud prevention methods.

Still further objects and advantages will become apparent from a consideration of the ensuing description and drawings.

LIST OF REFERENCE NUMERALS

10 a communication network
20 a computing location where facial comparison transactions are performed
  21 a connection of computing location to communication network
  22 a user interface and user authentication module
  24 a facial comparison transaction software
  26 a facebase, containing databases of digital facial images
    27 a checking account applicants database, facial images of applicants for new checking accounts
    28A a geographic database, geographic location of each applicant screening branch
    28B a check perpetrator database, facial images of known check fraud perpetrators
    28C a drivers' license applicants database, facial images of applicants for drivers' licenses
    28D a prior application history database
30 a first applicant screening branch
  31 a connection of first applicant screening branch to said communication network
  32 an applicant applying in person at this branch
  34 a digital camera
  36 an image capture computer
  38 image management and image communications software and hardware
40 a subsequent applicant screening branch
  41 a connection of subsequent applicant screening branch to said communication network
  42 an applicant applying in person at this subsequent branch
  44 a digital camera
  46 an image capture computer
  48 image management and image communications software and hardware

SUMMARY OF THE INVENTION

This invention prevents several widespread forms of account fraud by performing biometric facial screening of account holders at multiple branch locations.

The biometric facial screening is fast, affordable, nonintrusive, and takes place in person in the branch location.

However, the biometric facial comparison software is located at a Computing Location, readily accessible from each branch.

Even if false identification documents are used, perpetrators will be automatically detected as they attempt to go from branch to branch making bogus transactions, and they will be detected before any subsequent transactions are approved.

The present invention can detect behavior indicative of fraudulent application, even if no prior application is yet known to be fraudulent, and even if the current applicant's face does not match the face of any known perpetrator.

DETAILED DESCRIPTION OF THE PREFERRED EMBODIMENT

Figure 1:
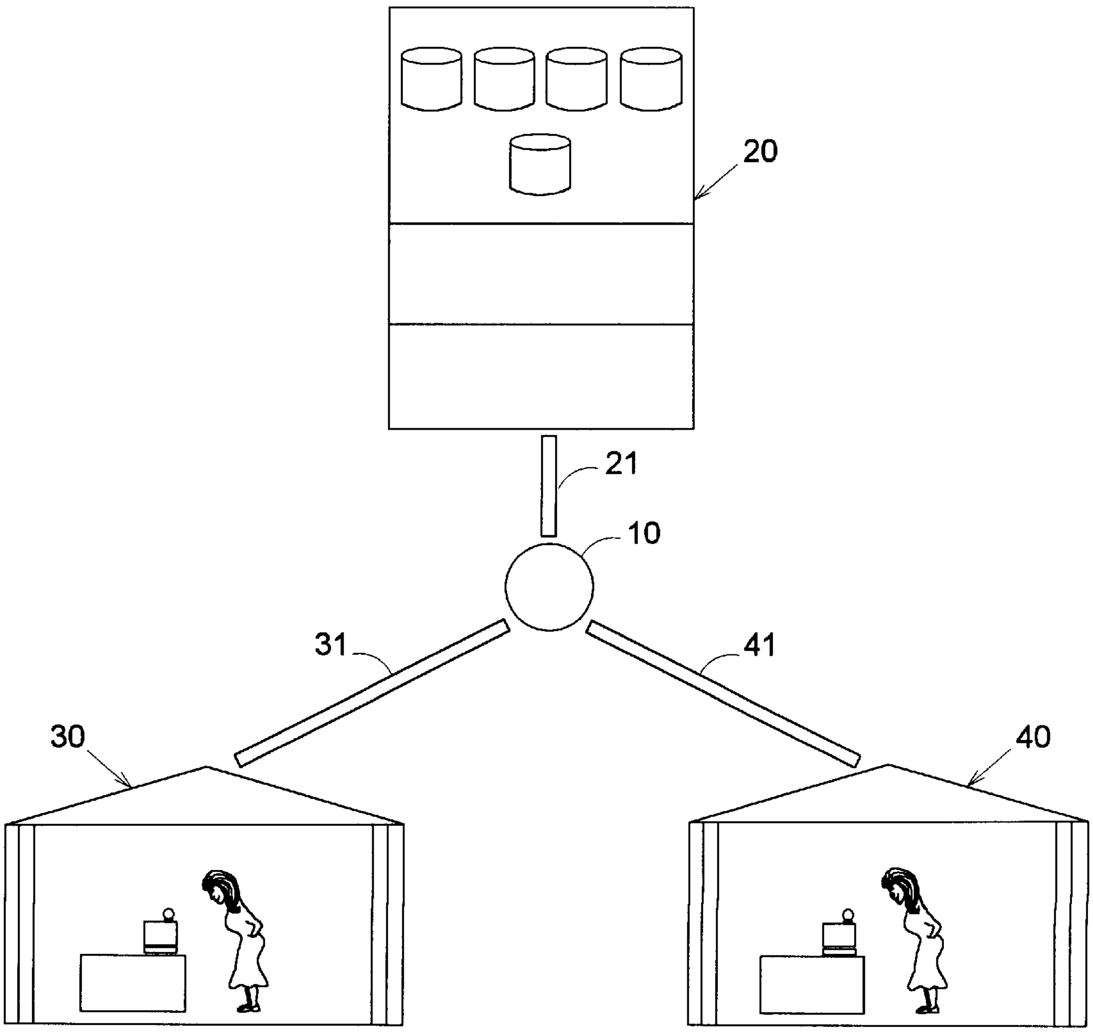
FIG. 1 shows the overall structure of the present invention.

Now referring to FIG. 1 which shows a schematic diagram of the overall structure of the invention, the communication network 10 provides digital communication between the computing location 20 where facial comparison transactions are performed, a first applicant screening branch 30 and subsequent applicant screening branches 40.

In the preferred embodiment, the Internet is used as the Communications Network 10, and the computing location 20 is an Internet Website.

The first applicant screening branch 30 is connected to the Internet computer network using the connection facilities 31 of a commercial service provider. In the preferred embodiment Earthlink Network provides this Internet connection.

One or more subsequent applicant screening branches 40 are also connected to the Internet computer network using the connection facilities 41 of a commercial service provider. In the preferred embodiment, Earthlink Network provides this connection to the Internet.

The Internet website 20 is connected to the Internet computer network 10 using the connection facilities 21 of a commercial service provider. In the preferred embodiment, the Internet website 20 has address http://www.phototrace.com, registered to John H. Payne, DBA Marathon Systems Research of Minneapolis, Minn. In the preferred embodiment the Internet connection facilities 21 are provided by Digiscape Communications of Davie, Fla.

Figure 2:
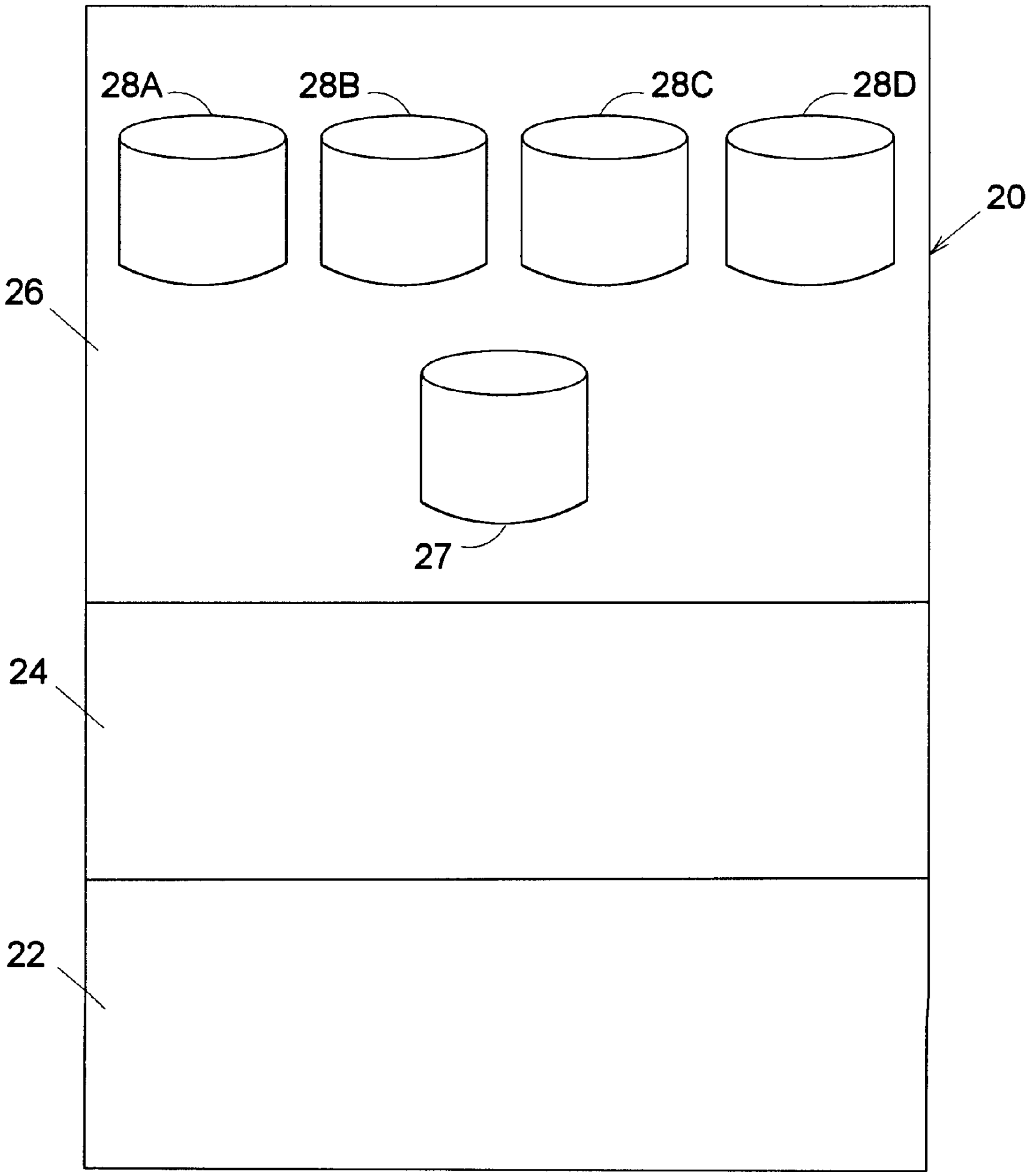
FIG. 2 shows component details of the computing location which hosts the facial comparison transactions.

Referring now to FIG. 2, which shows the detailed structure of the Internet website 20, the user interface and user authentication module 22 controls user access to the website and ensures that the user is authorized. In the preferred embodiment, only participating applicant screening branches are granted access to the Facial Comparison Transaction Software 24, and this is accomplished by means of assigning user identification numbers and passwords. This user/password control can readily be implemented using the Digiscape Communications password control panel.

The facial comparison transaction software 24 performs the biometric facial comparisons. In the preferred embodiment this function is performed using FaceIt T.M. software from Visionics, Inc. of Jersey City, N.J.

Specifically, the facial images being uploaded (i.e. transmitted) from any of the applicant screening branches 30 or 40 are compared against facial images previously stored in the facebase 26 to detect a match.

The facebase 26 can be implemented using any of a number of commercially available database management systems and approaches, including object-oriented database management, relational database management, or file-based approaches. In the preferred embodiment the Oracle Relational database Management System is utilized.

The facebase 26 is made up of a plurality of separate database components. The checking account applicants database 27 contains facial images of applicants for new checking accounts. The geographic database 28A contains the geographic position of each applicant screening branch. In the preferred embodiment this is the longitude and latitude of each applicant screening branch. The check perpetrator database 28B contains facial images of known check fraud perpetrators. (However, unlike prior art systems, the present invention does not rely on finding a facial image match with any known perpetrators).

Continuing the description of the facebase 26 components, the drivers' license applicants database 28C contains facial images of applicants for drivers' licenses. The prior application history database 28D stores the history of each prior application transaction. For example, in the preferred embodiment, this history includes indexes to the above described databases, a timestamp (i.e. date and time) of when each prior application transaction occurred, identifying information about the applicant including name, the identification number for the applicant screening branch that initiated the transaction, transaction type (e.g. open a new checking account), and a branch record locator Number. In the preferred embodiment, the Oracle Relational database Management System manages the above described data and data relationships.

Figure 3:
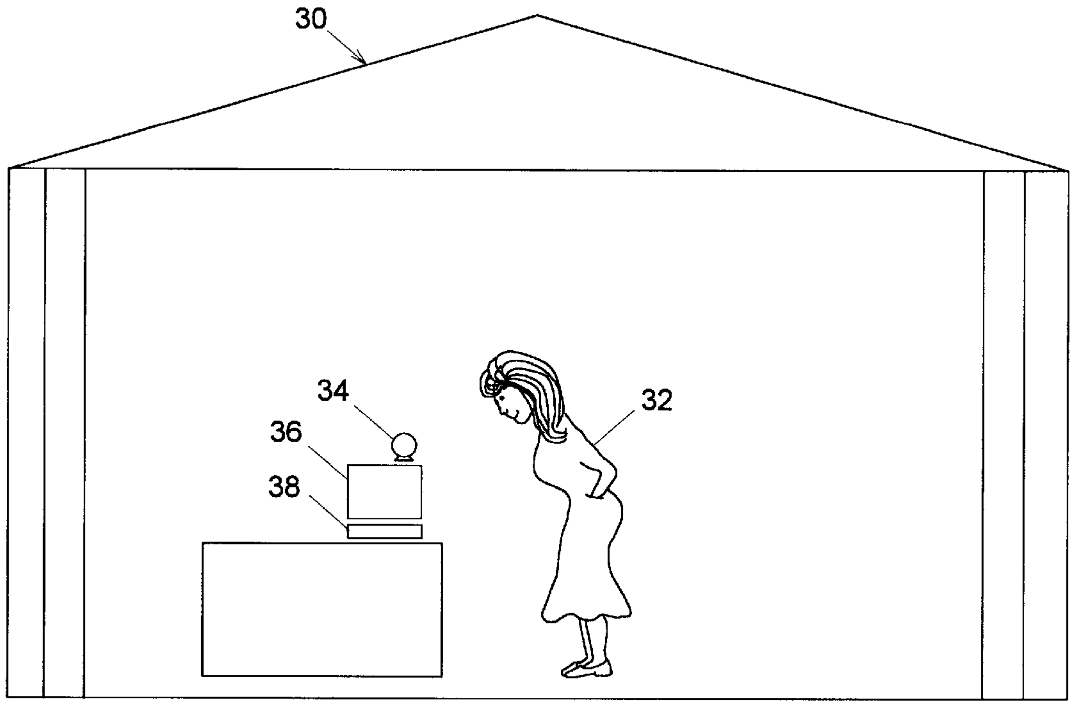
FIG. 3 shows component details of the first applicant screening branch equipped to perform biometric screening of applicants.

Referring now to FIG. 3, which shows the components of the first applicant screening branch 30, an applicant 32 has entered the branch, and is applying in person. A digital camera 34 captures a digital image of the face of the applicant 32, and continuously inputs this facial image into the image capture computer 36. image management and image communications software and hardware 38 allow further manipulation and review of the facial images, and once a satisfactory facial image has been selected, uploads (i.e. transmits) the selected facial image to the computing location 20 where it will be biometrically compared to other faces in the facebase 26.

In the preferred embodiment, the first applicant screening branch 30, may be any physical facility of a financial institution, including a Bank, Credit Union, or Savings & Loan, or any other depository institution capable of opening new checking accounts for an applicant 32 who applies in person. However, those skilled in the art will recognize that the concepts are not limited to the preferred embodiment, and that the applicant screening branch 30 may also include physical facilities where an applicant 32, may apply for a drivers' license in person, a financial services location where an applicant 32, may apply for a loan in person, and so forth.

In the preferred embodiment, the digital camera 34 is a Digital Vision DCVC camera together with a Digital Vision "Computer Eyes" video card. In the preferred embodiment, the image capture computer 36 is an Intel Pentium 100 MegaHerz, or faster, IBM-compatible personal computer with PCI bus. In the preferred embodiment, the image capture computer 36 also includes the Microsoft Windows 95 software, including the Microsoft Video for Windows (VFW) video driver.

In the preferred embodiment, the image management and image communications software and hardware 38 is comprised of a modem to provide a physical means of communication, and custom communications software written in the C language to automatically upload (i.e. transmit) the captured facial image and to automatically display the results of the facial comparison transaction on the image capture computer 36. The custom communications software will utilize the familiar "file transfer protocol" (ftp) already in widespread use for file transfers on the Internet.

Figure 4:
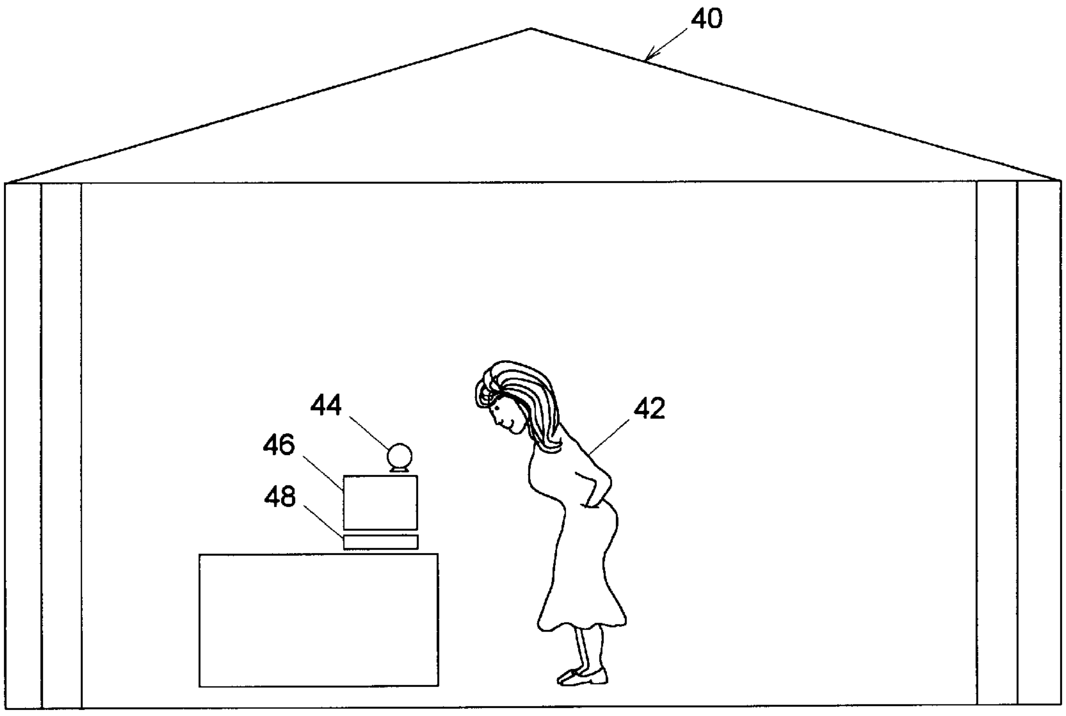
FIG. 4 shows component details of a subsequent applicant screening branch equipped to perform biometric screening of applicants.

Referring now to FIG. 4, which shows the components of a subsequent applicant screening branch 40, an applicant 42 has entered the branch, and is applying in person. A digital camera 44 captures a photographic image of the face of the applicant 42, and continuously inputs this facial image into the image capture computer 46. image management and image communications software and hardware 48 allow further manipulation and review of the facial images, and once a satisfactory facial image has been selected, uploads (i.e. transmits) the selected facial image to the computing location 20 where it will be biometrically compared to other faces in the facebase 26.

In the preferred embodiment, this subsequent applicant screening branch 40, may be any physical facility of a financial institution, including a Bank, Credit Union, or Savings & Loan, or any other depository institution capable of opening new checking accounts for an applicant 42 who applies in person. However, those skilled in the art will recognize that the concepts are not limited to the preferred embodiment, and that the applicant screening branch 40 may also include physical facilities where an applicant 42, may apply for a drivers' license in person, a financial services location where an applicant 42, may apply for a loan in person.

In the preferred embodiment, the digital camera 44 is a Digital Vision DCVC camera together with a Digital Vision "Computer Eyes" video card. In the preferred embodiment, the image capture computer 46 is an Intel Pentium 100 MegaHerz, or faster, IBM-compatible personal computer with PCI bus. In the preferred embodiment, the image capture computer 46 also includes the Microsoft Windows 95 software, including the Microsoft Video for Windows (VFW) video driver. In the preferred embodiment, the image management and image communications software and hardware 48 is comprised of a modem to provide a physical means of communication, and custom communications software written in the C language to automatically upload (i.e. transmit) the captured facial image and to automatically display the results of the facial comparison transaction on the image capture computer 46. The custom communications software will utilize the familiar "file transfer protocol" (ftp) already in widespread use for file transfers on the Internet.

Figure 5:
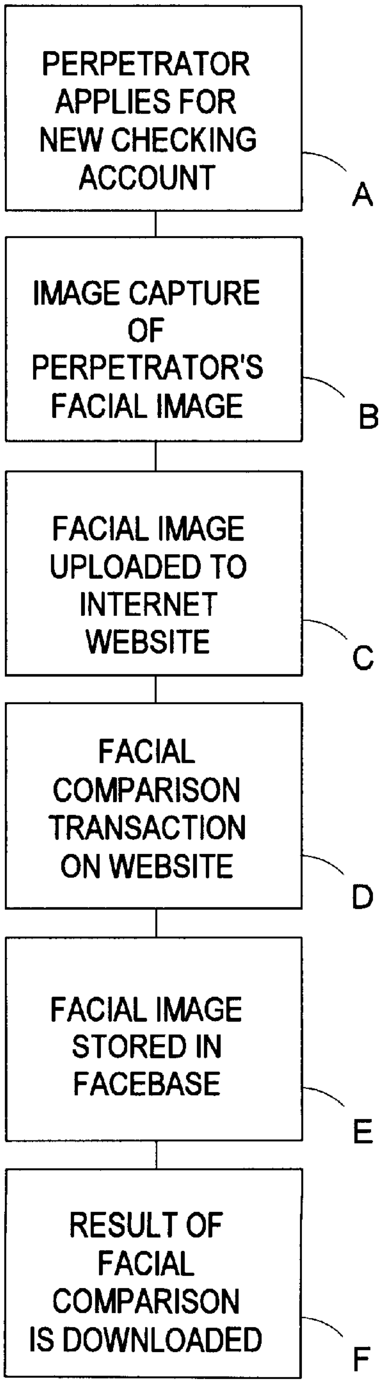
FIG. 5 shows how the biometric facial screening process works at the first applicant screening branch.
Figure 6:
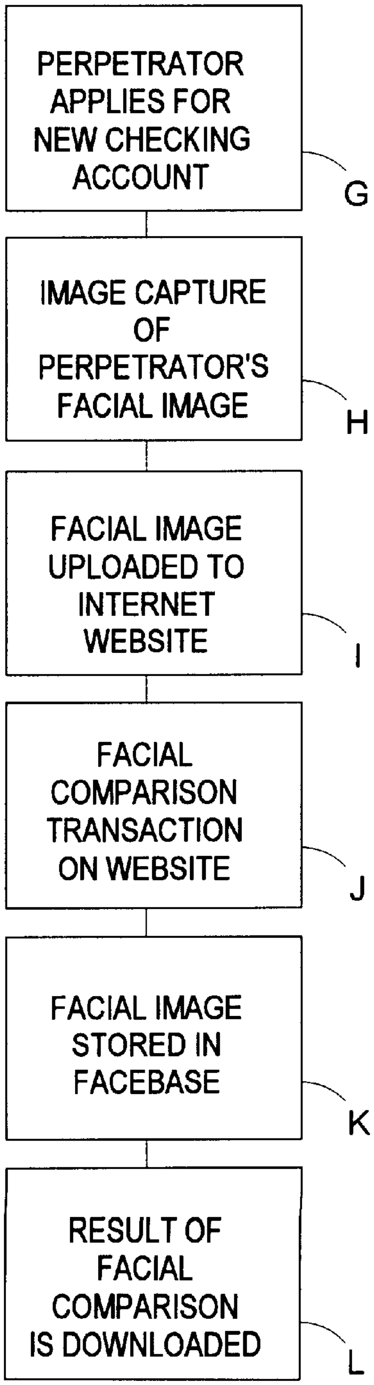
FIG. 6 shows how the biometric facial screening process works in all subsequent applicant screening branches.

Operation—FIGS. 5 and 6

An example specific to the prevention of check fraud is used in order to illustrate the operation of the present invention.

Now referring to FIG. 5, in Step A a check fraud perpetrator enters the first applicant screening branch 30 (in this case a financial institution branch; namely, a bank, credit union, or savings & loan branch) and applies to open a new checking account. Using a false identity and falsified documents, the perpetrator defeats the Chex System computer screening system of Deluxe Corporation and also the manual security procedures of the branch 30.

Still referring to FIG. 5, in Step B the perpetrators' facial image is captured according to the methods previously described; and in Step C the perpetrators facial image is uploaded to the computing location 20. Now in Step D, the perpetrators facial image is compared to facial images previously stored in the facebase 26. Unfortunately, since the perpetrator's facial image has not previously been stored in the facebase 26, he escapes detection. However, in Step E his facial image is added to the facebase 26, specifically, to the checking account applicants database 27, and the history of the transaction is logged in the prior application history database 28D.

Still referring to FIG. 5, in Step F the negative result of the facial comparison transaction (for example, a "no face match found" message) is returned to the first Financial Institution branch 30 and displayed on the image capture computer 36. Accordingly, the perpetrator has still escaped detection and succeeds in opening a new checking account in the first financial institution branch 30.

Referring now to FIG. 6, in Step G the perpetrator enters a subsequent Financial Institution branch 40, and applies to open another new checking account. Using a false identity and falsified documents, the perpetrator again defeats the Chex System computer screening system of Deluxe Corporation and also the manual security procedures of the subsequent branch 40.

Still referring to FIG. 6, in Step H the perpetrators' facial image is captured according to the methods previously described; and in Step I the perpetrators facial image is uploaded to the computing location 20. Now in Step J, the perpetrators facial image is compared to facial images previously stored in the facebase 26. This time, since the perpetrator's facial image was previously stored in the checking account applicants database 27 of the facebase 26 (refer to FIG. 5, Step E), a match is found, and the perpetrator's suspicious behavior of opening multiple checking accounts at different branches in a short time interval is detected. In Step K his latest facial image is added to the facebase 26, specifically, to the checking account applicants database 27, and the history of this transaction is logged in the prior application history database 28D.

Still referring to FIG. 6, in Step L the positive result of this facial comparison transaction (for example, a "WARNING—face match found" message) is returned to the subsequent financial institutio branch 40 and displayed on the image capture computer 46 along with the complete transaction history information for this facial image. (This transaction history was previously logged—during FIG. 5 Step E). Accordingly, the perpetrator's suspicious behavior has now been detected before this, or any, subsequent checking account has been opened.

An optional refinement of the above described operation may be implemented to speed execution of the facial comparison transaction software 24. The geographic database 28A, which stores the physical location of each branch, can optionally be accessed by the facial comparison transaction software 24, and used to to narrow the search for similar faces to search only those transactions in the prior application history database 28D that originated at nearby branches. The various databases of the facebase 26, are cross-indexed to each other, to facilitate this narrowing down of the search.

Note, that in the above detailed description of the present invention, no assumption was made that the current applicant's facial image will match the facial image of a known perpetrator. The check perpetrator database 28B is among the databases in the facebase 26 that can be searched for a facial match during the Facial Comparison Transactions (FIG. 5, Step D and FIG. 6, Step J). Unlike prior art approaches, the present invention can detect patterns of behavior indicative of applicant fraud even if the check perpetrator database 28B is empty, or not searched, or does not contain a match.

A further refinement relates to the type of digital facial image used in the present invention. Color and grayscale representations are commonly used for digital facial images, however, those skilled in the are will understand that bilevel representation will also be effective. For example, U.S. Pat. No. 5,329,381, titled AUTOMATIC ENGRAVING METHOD AND APPARATUS, issued Jul. 12, 1994 discloses a method by which graysdcale images can be automatically converted without dithering to bilevel while retaining excellent recognition. In the present invention bilevel images produced without dithering are used for all biometric facial comparisons.

It will be appreciated by persons skilled in the art that the present invention is not limited by what has been particularly shown and described hereinabove. Rather the scope of the present invention is defined only by the claims which follow.

What is claimed is:

1. A method of screening applicants comprising the steps of:

(a) receiving a request to apply from an applicant, said applicant appearing in person at an applicant screening branch;

(b) capturing a digital facial image of said applicant;

(c) converting without dithering said digital facial image of said applicant to a bilevel digital facial image of said applicant;

(d) transmitting said bilevel digital facial image of said applicant, along with data identifying said request to apply, from said applicant screening branch to a computing location;

(e) comparing, using computer based face recognition at said computing location, said bilevel digital facial image of said applicant with the bilevel digital facial images of prior applicants;

(f) examining, using computer accessible databases, a history of prior requests to apply from applicants whose bilevel digital facial images closely resemble said applicant, to detect behavior indicative of application fraud;

(g) updating, automatically, using computer accessible databases, said history of prior requests to apply, to include said bilevel digital facial image of said applicant, along with said data identifying said request to apply;

(h) providing notification of the results of the examination for application fraud, to encourage further scrutiny and a possible rejection of said request to apply, as appropriate;

(i) repeating all the above steps, a through h, for any subsequent request to apply at any subsequent applicant screening branch.

2. The method of claim 1 wherein a digital communication network, is the means of transmission.

3. The method of claim 1 wherein the Internet is the means of transmission.

4. The method of claim 1 wherein an Internet website, or a plurality of Internet websites, serves as said computing location.

5. The method of claim 1 wherein said applicant screening branch is any branch location of a U.S. bank, credit union, savings and loan, or other U.S. depository institution, capable of receiving said request to apply, in person, from said applicant.

6. The method of claim 1 wherein said request to apply is a request to open a new checking account, or a new share draft account.

7. The method of claim 1 wherein the updating step occurs at any time before the repeating step and after the transmitting step.

8. The method of claim 1 wherein a computer accessible geographic database is used to limit the examining of said history of prior requests to apply, to examine only the prior requests to apply that originated nearby said applicant screening branch.

9. The method of claim 1 wherein said digital facial image of said applicant is also compared to the digital facial images of known perpetrators using said computer based face recognition.

10. A method of screening applicants for check cashing privileges or pay-by-check privileges comprising the steps of:

(a) receiving a request for said privileges from an applicant, said applicant appearing in person at an applicant screening branch;

(b) capturing a digital facial image of said applicant;

(c) converting without dithering said digital facial image of said applicant to a bilevel digital facial image of said applicant;

(d) transmitting said bilevel digital facial image of said applicant, along with data identifying said request for said privileges, from said applicant screening branch to a computing location;

(e) comparing, using computer based face recognition at said computing location, said bilevel digital facial image of said applicant with the bilevel digital facial images of prior applicants;

(f) examining, using computer accessible databases, a history of prior requests to apply from applicants whose bilevel digital facial images closely resemble said applicant, to detect behavior indicative of fraud;

(g) updating, automatically, using computer accessible databases, said history of prior requests to apply, to include said digital facial image of said applicant, along with said data identifying said request for said privileges;

(h) providing notification of the results of the examination for application fraud, to encourage further scrutiny and a possible rejection of said request for said privileges, as appropriate;

(i) repeating all the above steps, a through h, for any subsequent request for said privileges at any subsequent applicant screening branch.

11. The method of claim 10 wherein a digital communication network, is the means of transmission.

12. The method of claim 10 wherein the Internet is the means of transmission.

13. The method of claim 10 wherein an Internet website, or a plurality of Internet websites, serves as said computing location.

14. The method of claim 10 wherein said applicant screening branch is any branch location of a U.S. bank, credit union, savings and loan, or other U.S. depository institution, capable of receiving said request to for said privileges, in person, from said applicant.

15. The method of claim 10 wherein said applicant screening branch is any merchant location or check cashing service location capable of receiving said request for said privileges, in person, from said applicant.

16. The method of claim 10 wherein the updating step occurs at any time before the repeating step and after the transmitting step.

17. The method of claim 10 wherein said digital facial image of said applicant is also compared to the digital facial images of known perpetrators using said computer based face recognition.

* * * * *